(12) United States Patent
Takasaki et al.

(10) Patent No.: US 7,808,739 B2
(45) Date of Patent: Oct. 5, 2010

(54) DISK DRIVE DEVICE AND SERVO CONTROL METHOD THEREOF

(75) Inventors: Kohji Takasaki, Kanagawa (JP); Isao Yoneda, Kanagawa (JP); Nobuhiko Wasa, Kanagawa (JP); Yasuhiro Iihara, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/290,267

(22) Filed: Oct. 28, 2008

(65) Prior Publication Data

US 2009/0135516 A1    May 28, 2009

(30) Foreign Application Priority Data

Nov. 28, 2007 (JP) ............................. 2007-308069

(51) Int. Cl.
*G11B 21/02* (2006.01)
(52) U.S. Cl. ...................................................... 360/75
(58) Field of Classification Search ........................ None
See application file for complete search history.

(56) References Cited

U.S. PATENT DOCUMENTS

| | | | |
|---|---|---|---|
| 5,369,345 A | * | 11/1994 | Phan et al. ................. 318/561 |
| 6,898,046 B2 | * | 5/2005 | Sri-Jayantha et al. ..... 360/77.02 |
| 6,934,116 B2 | | 8/2005 | Iwashiro |
| 7,035,034 B2 | | 4/2006 | Semba et al. |
| 7,141,951 B2 | | 11/2006 | Hosono et al. |
| 7,561,365 B2 | * | 7/2009 | Noguchi et al. ............... 360/75 |
| 2007/0217052 A1 | | 9/2007 | Semba et al. |

FOREIGN PATENT DOCUMENTS

| | | |
|---|---|---|
| JP | 2003-346439 | 12/2003 |
| JP | 2006-221806 | 8/2006 |

* cited by examiner

*Primary Examiner*—K. Wong
(74) *Attorney, Agent, or Firm*—Townsend and Townsend and Crew (57) ABSTRACT

Embodiments of the present invention help to perform appropriate servo control in response to detected vibration in a disk drive device having a vibration sensor. In an embodiment of the present invention, an HDD switches a correction servo mode to perform vibration correction in head positioning and a normal servo mode not to perform the vibration correction. The HDD performs servo positioning in either one of the serve modes and determines servo positioning accuracy in the servo mode from the measured positional error signal. The HDD obtains data indicating the servo positioning accuracy in the other servo mode from a table. The HDD compares the accuracy in the two servo modes and selects the servo mode with higher accuracy. The table contains previous measurements on servo positioning accuracy in the servo modes.

20 Claims, 8 Drawing Sheets

|  | SERVO MODE ||
|  | RV FF DISABLE | RV FF ENABLE |
| --- | --- | --- |
| HD0, ZN0 | DATA xx | DATA xx |
| HD0, ZN1 | DATA xx | DATA xx |
| ⋮ | ⋮ | ⋮ |
| HD0, ZNn | DATA xx | DATA xx |
| ⋮ |  |  |
| HDm, ZN0 | DATA xx | DATA xx |
| HDm, ZN1 | DATA xx | DATA xx |
| ⋮ | ⋮ | ⋮ |
| HDm, ZNn | DATA xx | DATA xx |

DISK DRIVE DEVICE AND SERVO CONTROL METHOD THEREOF

CROSS-REFERENCE TO RELATED APPLICATION

The instant nonprovisional patent application claims priority to Japanese Patent Application No. 2007-308069 filed Nov. 28, 2007, and which is incorporated by reference in its entirety herein for all purposes.

BACKGROUND OF THE INVENTION

Disk drive devices using various kinds of disks, such as optical disks, magneto-optical disks, flexible magnetic disks, and the like have been known in the art. In particular, hard disk drives (HDDs) have been widely used as storage devices of computers and have been one of indispensable storage devices for current computer systems. Moreover, the HDDs have found widespread application to moving image recording/reproducing apparatuses, car navigation systems, cellular phones, and the like, in addition to the computers, due to their outstanding characteristics.

A magnetic disk used in an HDD has multiple concentric data tracks and servo tracks. Each servo track contains multiple servo data having address information. Each data track includes multiple data sectors containing user data recorded thereon. Data sectors are recorded between servo data discrete in the circumferential direction. A head element portion of a head slider supported by a swinging actuator accesses a desired data sector in accordance with address information in the servo data to write data to and retrieve data from a data sector.

An HDD positions a head slider using a swing actuator. Accordingly, if an HDD receives external vibration, the actuator vibrates so that the HDD has difficulty in performing accurate head positioning. To this end, an approach has been proposed that mounts a vibration sensor on the HDD and incorporates the vibration detected by the vibration sensor into the servo control for the head positioning (servo positioning) by means of feed-forward control to suppress the influence of the external vibration to the servo positioning. In particular, in a system having a plurality of HDDs arranged closely to each other such as a server system, vibrations caused by operation of other HDDs greatly affect the servo positioning so that a technique for detecting vibration by a vibration sensor and servo controlling responsive to the detected vibration is requisite.

The vibration sensor used in servo positioning detects vibration(s) in all directions parallel to the recording surface. This is because the actuator swings in the in-plane direction and vibration in the in-plane direction significantly affects the servo control. Typically, a rotational vibration sensor (RV sensor) is mounted on the HDD. The RV sensor directly detects rotational vibration or consists of two sensors for detecting vibration in a linear direction. The two sensors detect vibration (acceleration) in the X direction and the Y direction respectively, and the sensor can detect vibration(s) in all directions in the plane from those detected values.

For the RV sensor consisting of two sensors, the characteristics of the two sensors do not completely agree with each other due to manufacturing variations. If the difference between the characteristics of the two sensors is large, the possibility of erroneous detection by the RV sensor becomes higher. The RV sensor generally is mounted on a control circuit board fixed outside the HDD. This control circuit board slightly vibrates in the in-plane direction due to a warp of the substrate even when external vibration is applied in the Z direction. Therefore, the RV sensor sometimes erroneously detects vibration in the in-plane direction in vibration in the Z direction. This becomes clearly apparent if the control circuit board is thin, and therefore, will become a problem, particularly in a compact HDD.

The erroneous detection by the RV sensor leads to degradation in servo positioning and degrades the throughput (performance) of the HDD. Therefore, in order to prevent the degradation in servo positioning induced by the erroneous detection by the RV sensor, a technique which controls correction in the servo positioning using the vibration detected by the RV sensor is disclosed in a Japanese Patent Publication No. 2003-346439 ("Patent Document 1"). An HDD disclosed in Patent Document 1 calculates correction signals to be injected into a servo loop from outputs of the RV sensor, and further predicts the effect of the correction signals injected into the servo loop. The HDD then determines whether or not to inject the correction signals to the servo loop and dynamically controls gain of the RV sensor in accordance with the prediction.

As described above, the correction function for servo positioning using the RV sensor enabled and disabled depending on conditions can prevent degradation in servo positioning induced by erroneous detection by the RV sensor. However, the technique in the Patent Document 1 predicts the effect of the correction signals to determine the necessity of the correcting operation and the HDD does not actually observe the effect by the correction so that the predicted effect may not be accurately reflected to the actual servo positioning with vibration correction. On the other hand, determination whether or not to perform the vibration correction for the head positioning should not take much process time. Consequently, more accurate and efficient approach is required to determine whether or not to perform the vibration correction for the servo positioning.

BRIEF SUMMARY OF THE INVENTION

Embodiments of the present invention help to perform appropriate servo control in response to detected vibration in a disk drive device having a vibration sensor. In an embodiment of the present invention, an HDD switches a correction servo mode to perform vibration correction in head positioning and a normal servo mode not to perform the vibration correction. The HDD performs servo positioning in either one of the serve modes and determines servo positioning accuracy in the servo mode from the measured positional error signal. The HDD obtains data indicating the servo positioning accuracy in the other servo mode from a table. The HDD compares the accuracy in the two servo modes and selects the servo mode with higher accuracy. The table contains previous measurements on servo positioning accuracy in the servo modes.

DETAILED DESCRIPTION OF THE INVENTION

Embodiments of the present invention relate to a disk drive device and a servo control method thereof, more particularly, servo control coping with vibration.

A disk drive device according to an embodiment of the present invention comprises a disk for storing data, a head for accessing the disk, a moving mechanism for supporting and moving the head, a vibration sensor, and a controller for having a correction servo mode to correct servo control of positioning of the head in accordance with detection of the vibration sensor and a normal mode without using the correction. The controller determines accuracy in a current servo mode from an error between a servo signal retrieved and the disk with the head from a target track. The controller selects a servo mode with higher accuracy comparing accuracy in the current servo mode with accuracy in a servo mode different from the current mode stored in a table. The controller performs positioning of the head using the moving mechanism in the selected servo mode. Determining accuracy of the current servo mode by measurement and comparing the value with the accuracy in a different servo mode stored in a table accomplishes an efficient and proper determination of an appropriate servo mode.

The controller may update the table by data indicating accuracy measured in the current servo mode, which accomplishes more proper determination of an appropriate servo mode. Or, the controller may perform positioning of the head using the moving mechanism in the current servo mode if accuracy in the current servo mode is within a reference range. This reduces processing load to the controller due to additional processes.

The disk drive device may comprise a plurality of heads, with the table containing the accuracy in each of the heads. Furthermore, the table may contain the accuracy in each of the areas into which a recording surface corresponding to a head is divided. In one example, recording formats are the same in each of the divided areas, and respective recording formats in the divided areas are different from each other. This accomplishes more proper determination of an appropriate servo mode. The controller may calculate accuracy corresponding to one area from position error signals of different data tracks in the area. This prevents shortage in update frequency of the table.

The controller may use the correction servo mode in moving of the head to the target if the moving length to the target is greater than a reference value. This accomplishes a proper servo control in the moving. The controller may clear data stored in the table if the controller moves the head to a retract position. This accomplishes more proper determination of an appropriate servo mode. The disk drive device may comprise a plurality of heads, and the controller can maintain the servo mode in switching heads. This accomplishes a more proper servo positioning.

Another aspect of embodiments of the present invention is a method for servo control in a disk drive device having a correction servo mode for correcting servo control for head positioning in accordance with detection of a vibration sensor, and a normal servo mode without using the correction. This method determines accuracy in a current servo mode from an error between a servo signal retrieved from a disk with a head and a target track. It selects a servo mode with higher accuracy comparing accuracy in the current servo mode with accuracy in a servo mode different from the current servo mode stored in a table. It performs positioning of the head using a moving mechanism in the selected servo mode.

Embodiments of the present invention accomplish appropriate servo control responsive to detected vibration in a disk drive device including a vibration sensor.

Hereinafter, embodiments to which the present invention has been applied will be described. For clarity of explanation, the following descriptions and accompanying drawings may have omissions and simplifications as appropriate. Throughout the drawings, like components are denoted by like reference numerals and repetitive descriptions are omitted as not necessary. Hereinafter, embodiments of the present invention will be described by way of example of a hard disk drive (HDD) as an example of a disk drive device.

An HDD according to certain embodiments has a vibration sensor and corrects servo control (servo positioning) in head positioning using the detected value of the sensor. Moreover, the HDD switches a correction servo mode to perform this vibration correction and a normal servo mode not to perform the vibration correction. The HDD performs servo positioning in either of the servo modes and determines the accuracy in servo positioning in the servo mode from the monitored position error signals (PES). If required servo positioning accuracy is not achieved, the HDD selects an appropriate servo mode.

The HDD obtains data indicating the servo positioning accuracy in the other servo mode from a table. The HDD compares accuracy in the two servo modes and selects the servo mode with higher accuracy. The table contains past measured results on servo positioning accuracy in each servo mode. The HDD updates the data stored in the table with the servo positioning accuracy newly determined from the measurement. The measuring the servo positioning accuracy in the current servo mode achieves proper determination of the appropriateness of the current servo mode. On the other hand, using the previous measured results for the accuracy in the other servo mode achieves shorter process time in determining the servo mode.

Updating the data in the table with the newly measured servo positioning accuracy achieves more proper determination. As described above, the HDD determines whether or not to switch the servo modes if the accuracy in the current servo mode is low. If the current servo mode achieves required accuracy, it is not necessary to switch the servo modes so that the processing time in determining the appropriate servo mode and switching the modes can be omitted.

Figure 1:
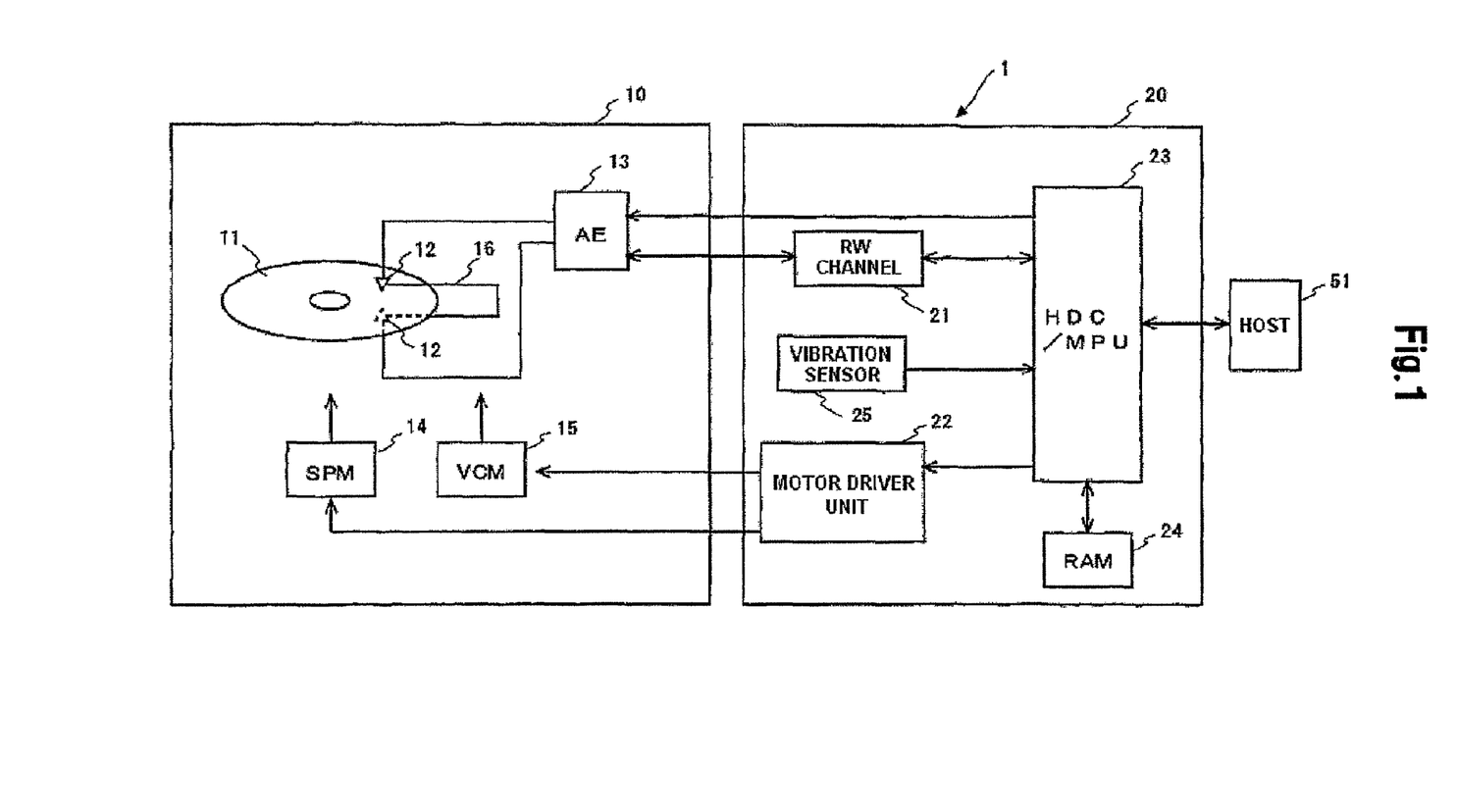
FIG. 1 is a block diagram schematically depicting the entire configuration of a hard disk drive according to one embodiment.

Before describing details of the servo positioning according to certain embodiments, an entire configuration of an HDD will be outlined. FIG. 1 is a block diagram schematically depicting the entire configuration of an HDD 1. The HDD 1 comprises a magnetic disk 11, a disk for storing data, inside an enclosure 10. A spindle motor (SPM) spins the magnetic disk 11 at a specific angular rate. Head sliders 12 are provided to access (read or write) the magnetic disk 11; each of them corresponds to each recording surface of the magnetic disk 11.

Access is a broader concept comprising read and write. Each head slider 12 comprises a slider for flying over the magnetic disk and a head element portion fixed on a slider for converting magnetic signals to and from electric signals. Each of the head slider 12 is fixed to a tip end of an actuator 16. The actuator 16, which is coupled to a voice coil motor (VCM) 15, pivots about a pivotal shaft to move the head sliders 12 above the magnetic disk 11 in its radial direction. The actuator 16 and the VCM 15 are moving mechanisms of the head sliders 12.

On a circuit board 20 fixed outside the enclosure 10, circuit elements are mounted. A motor driver unit 22 drives the SPM 14 and the VCM 15 in accordance with control data from an HDC/MPU 23. A RAM 24 functions as a buffer for temporarily storing read data and write data. An arm electronics (AE) 13 inside the enclosure 10 selects a head slider 12 to access the magnetic disk 11 from multiple head sliders 12, amplifies reproducing signals therefrom to send them to a read-write channel (RW channel) 21. Further, it sends recording signals from the RW channel 21 to the selected head slider 12.

The RW channel 21, in read operation, amplifies read signals supplied from the AE 13 to have specific amplitudes, extracts data from the obtained read signals, and performs a decoding process. The retrieved data includes user data and servo data. The decoded read user data and servo data are supplied to the HDC/MPU 23. The RW channel 21, in write operation, code-modulates write data supplied from the HDC/MPU 23, converts the code-modulated data into write signals, and then supplies them to the AE 13.

The HDC/MPU 23, an example of a controller, performs entire control of the HDD 1 in addition to necessary processes concerning data processing such as read/write operation control, command execution order management, positioning control of the head sliders 12 using servo signals (servo control), interface control to and from a host 51, defect management, and error handling operations when any error occurs. The HDC/MPU 23 according to the present embodiment has a correction servo mode in which the HDC/MPU 23 corrects servo positioning in accordance with vibration detected by a vibration sensor 25 and a normal servo mode in which the HDC/MPU 23 performs servo positioning without vibration correction. The HDC/MPU 23 switches the two servo modes to perform head positioning in an appropriate servo mode. This will be described in detail later.

Figure 2:
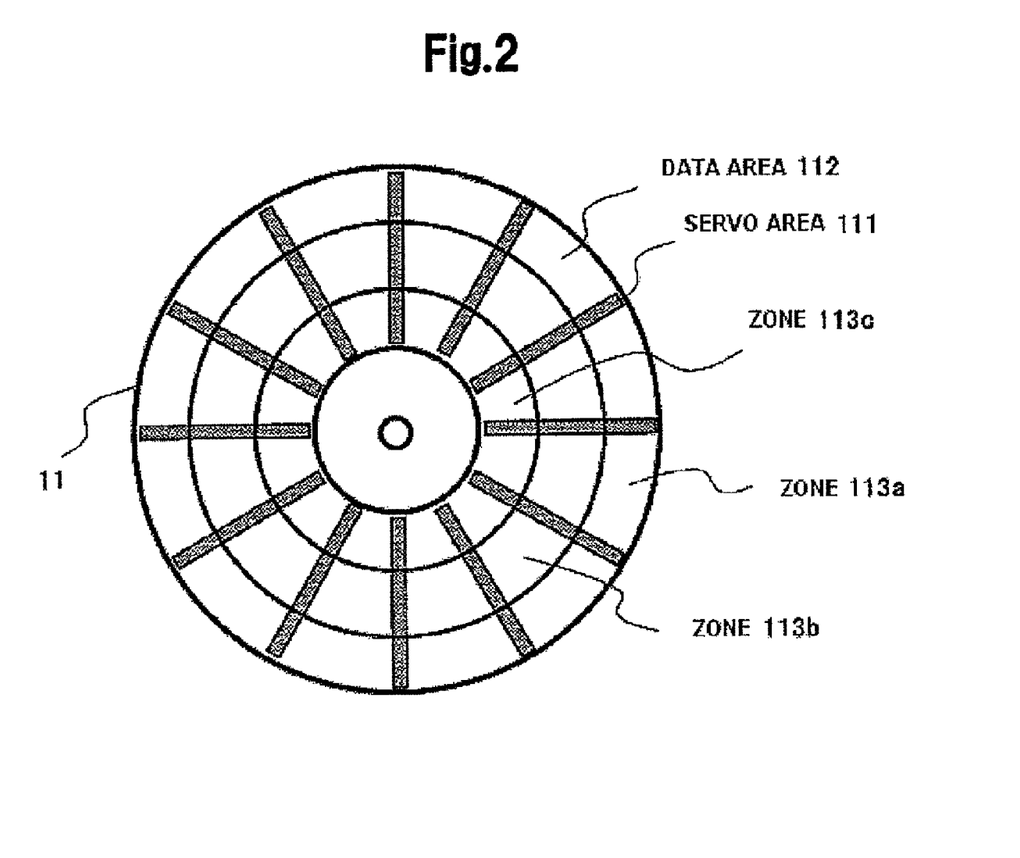
FIG. 2 is a diagram schematically illustrating the data format on a recording surface in one embodiment.

FIG. 2 schematically depicts recorded data on the magnetic disk 11. On the recording surface of the magnetic disk 11, multiple servo areas 111 each extending radially in the radial direction from the center of the magnetic disk 11 and being located at every specific angle and data areas 112 each formed between two adjacent servo areas 111 are provided. Each servo area 111 and each data area 112 are provided alternately at a specific angle. In each servo area 111, servo data for positional control of head sliders 12 are recorded. In each data area 112, user data are recorded. User data and servo data are recorded on concentric data tracks and servo tracks, respectively. In FIG. 2, the data tracks are grouped into a plurality of zones 113a to 113c according to their radial positions. Recording frequency and a data track pitch are set to each of the zones and the number of data sectors included in a data track differs depending on the zone.

Figure 3:
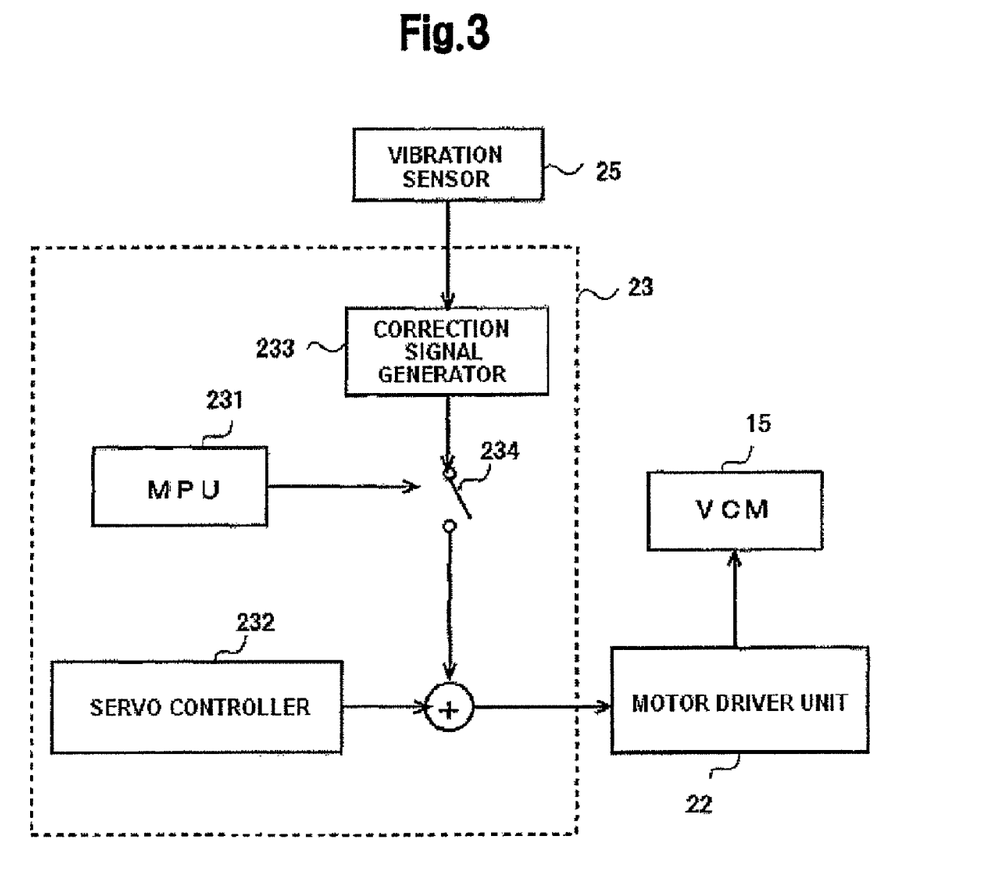
FIG. 3 is a block diagram schematically illustrating logic components relate to servo positioning in one embodiment.

Hereinafter, servo positioning according to one embodiment will be described more specifically. FIG. 3 is a block diagram schematically depicting logic components relating to the servo positioning of the present embodiment. The HDC/MPU 23 comprises a servo controller 232, which calculates a position error signal (PES) between the target data track and the servo signal retrieved by the head slider 12 and determines VCM current so that the absolute value of the PES will be smaller.

A correction signal generator 233 calculates a correction value for servo positioning from the vibration detected by the vibration sensor 25. When a switch 234 is ON, the correction value from the correction signal generator 233 is added to an output value of the servo controller 232 and is transferred to a motor driver unit 22. When the switch 234 is OFF, the output value of the servo controller 232 is not corrected and is transferred to the motor driver unit 22 as it is. The motor driver unit 22 supplies VCM current to a VCM 15 in accordance with control data obtained from the HDC/MPU 23.

Feed-forward control correcting vibration using the values detected by the vibration sensor 25 achieves more precise servo positioning if external vibration exists. Note that another configuration may be proposed in which the motor driver unit 22 comprises a correction signal generator 233 and a switch 234 and the HDC/MPU 23 controls the switch 234. In this case, the detection value of the vibration sensor 25 is input to the motor driver unit 22.

The vibration sensor 25 is typically a rotational vibration sensor (RV sensor) and is mounted on a control circuit board 20. The vibration sensor 25 detects rotation and vibration in a parallel direction to a recording surface of a magnetic disk 11. An MPU 231 switches servo positioning modes to cope with manufacturing tolerance of the vibration sensor 25 or erroneous detection by the vibration sensor 25 in the in-plane direction (X-Y direction) of the control circuit board 20 due to vibration in the Z direction vertical to the recording surface. Specifically, the MPU 231 turns ON or OFF the switch 234 to enable or disable the vibration correction function. The servo mode when the switch 234 is ON is a correction servo mode and the one when the switch is OFF is a normal servo mode.

The HDC/MPU 23 performs different types of servo positioning in a seek operation and in a following operation in read/write operation. Therefore, switching the correction servo mode and the normal servo mode is different between a seek operation and a following operation. Now referring to FIGS. 4 and 5(a), setting of the servo mode in a seek operation will be described. The setting of the servo mode is the same in a seek operation in a read operation and a seek operation in a write operation.

Figure 4:
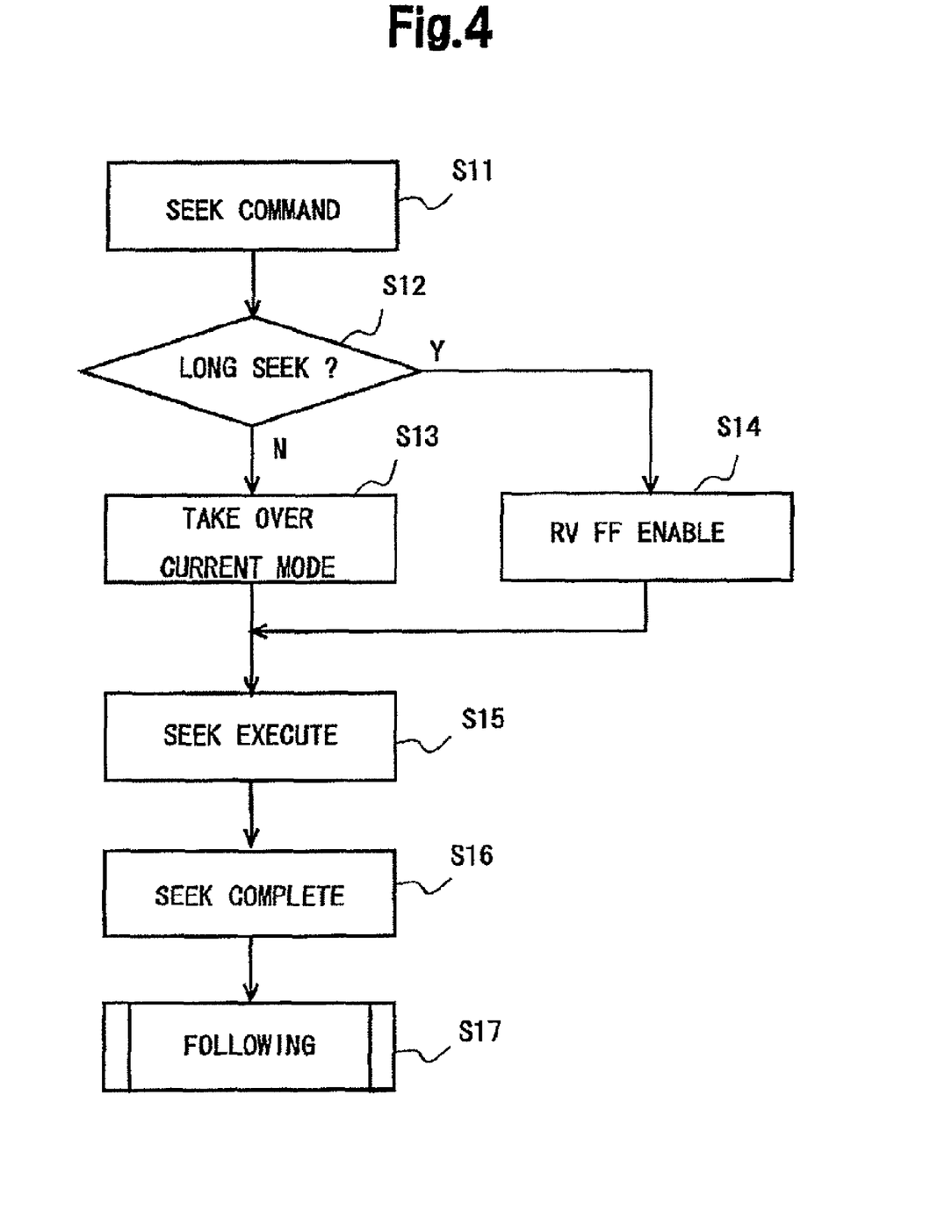
FIG. 4 is a flowchart illustrating a flow of setting a servo mode in a seek operation in one embodiment.

As shown in the flowchart of FIG. 4, the HDC/MPU 23 obtains a read/write command ordering a seek operation from a host 51 (S11). The command designates the address of the target track. The HDC/MPU 23 calculates the seek length (SL) between the current data track where the head slider 12 is positioned (CURRENT in FIG. 5(a)) and the target data track (TARGET in FIG. 5(a)). The seek length can be expressed by the number of data tracks or the number of servo tracks. If the seek length SL is not more than a reference value and the movement to the target track is a short seek (N in S12), the HDC/MPU 23 uses the servo mode in the last seek operation or following operation in accordance with the design (S13). In the initial state, the HDC/MPU 23 uses a normal servo mode, for example.

If the seek length is more than the reference value and the movement to the target track is a long seek (Y in S12), the HDC/MPU 23 enables the vibration correction function to select the correction servo mode (S14). As described above, the setting of the vibration correction function is performed by the HDC/MPU 23 turning ON/OFF the switch 234. Then, the HDC/MPU 23 controls the actuator 16 in the selected servo mode to move the head slider 12 to the target track (S15). When the head slider 12 reaches the target track and the position of the head slider 12 becomes stable in the vicinity of the target track, the HDC/MPU 23 completes the seek operation (S16) and starts a following operation (S17).

Servo positioning in a typical seek operation controls the actuator 16 by velocity control immediately after the start of the seek operation, and then, by positioning control after the head slider 12 has come close to the target track. This control may be sometimes referred to as settling. In positional control in a seek operation, the head slider 12 moves (vibrates) between the inner side and the outer side of the target track. When the amplitude of the vibration becomes small, the HDC/MPU 23 transfers from the seek operation to the following operation.

In a seek operation, the vibration amplitude of the head slider 12 across the target track becomes larger as the seek length becomes greater. The vibration of the head slider 12 means the vibration of the actuator 16 in the in-plane direction. This self vibration of the actuator 16 affects the servo positioning in the same manner as the external vibration. Therefore, the HDC/MPU 23 according to the present embodiment selects the servo mode in accordance with the seek length. If the seek length is great, the HDC/MPU 23 uses the correction servo mode and if the seek length is small, it uses the normal servo mode without performing vibration correction. This achieves more precise correction of influence of the self vibration caused by a seek operation.

Figure 6:
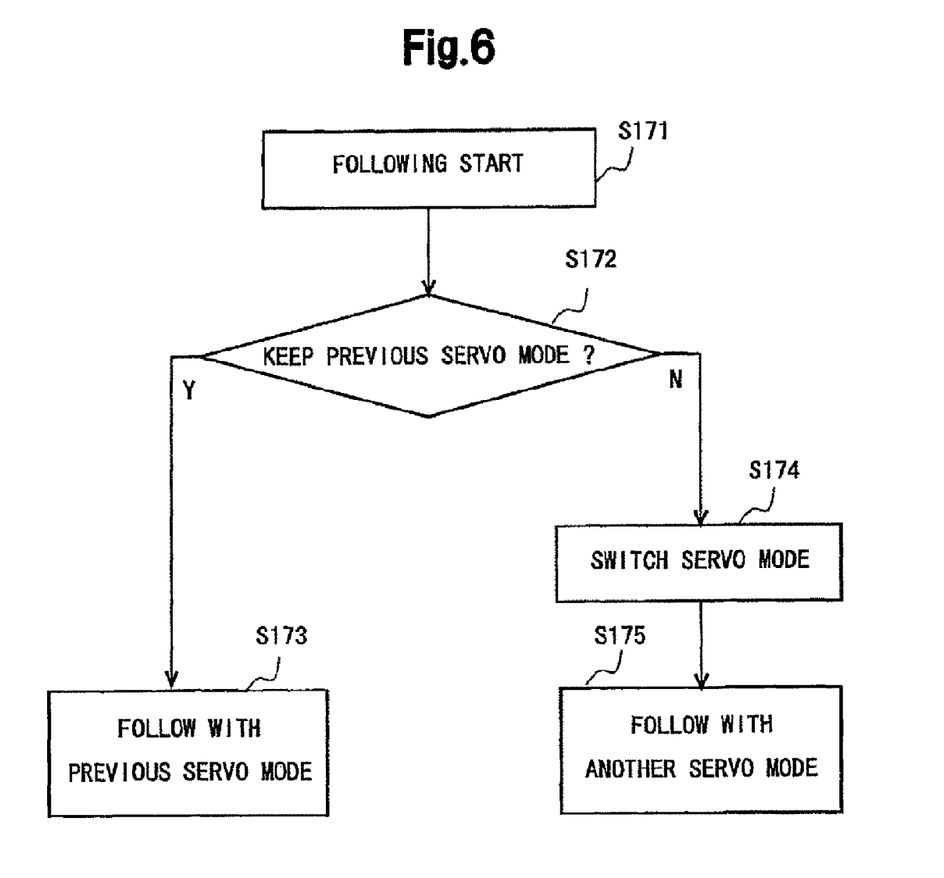
FIG. 6 is a flowchart illustrating a flow of setting a servo mode in a following operation in one embodiment.

After the completion of the seek operation (S16), the HDC/MPU 23 performs a following operation (S17). As shown in the flowchart of FIG. 6, the HDC/MPU 23 starts a following operation (S171). The following operation is a kind of positional control; the HDC/MPU 23 controls the actuator 16 so that the PES from the target data track will stay within a reference range. Typically, positional control in a following operation is different from the one in a seek operation in gain in a servo loop. The HDC/MPU 23 performs servo positioning in the servo mode of the last following operation. The HDC/MPU 23 keeps data indicating the servo mode in the last following operation and can know the servo mode in the last following by referring to the data.

Next, the HDC/MPU 23 determines the servo mode in the following operation (S172). If the HDC/MPU 23 determines to use the same servo mode as the one in the last following operation (Y in S172), it maintains the current servo mode (the servo mode in the last following) to perform a following operation on the target track (S173). If the HDC/MPU 23 determines to use a servo mode different from the one in the last following operation (N in S172), it enables/disables the vibration correction function to switch the servo mode (S174).

The HDC/MPU 23 performs a following operation on the target track in the servo mode different from the current servo mode (the servo mode in the last following operation) (S175). If a head change (switch of the head sliders 12 to access the magnetic disk 11) is performed in the following operation, the HDC/MPU 23 maintains the current servo mode without switching the servo mode. If the head slider 12 can access the target sector during the operation in the flowchart of FIG. 6, the HDD 1 performs the operation with priority, which can prevent performance degradation.

Figure 7:
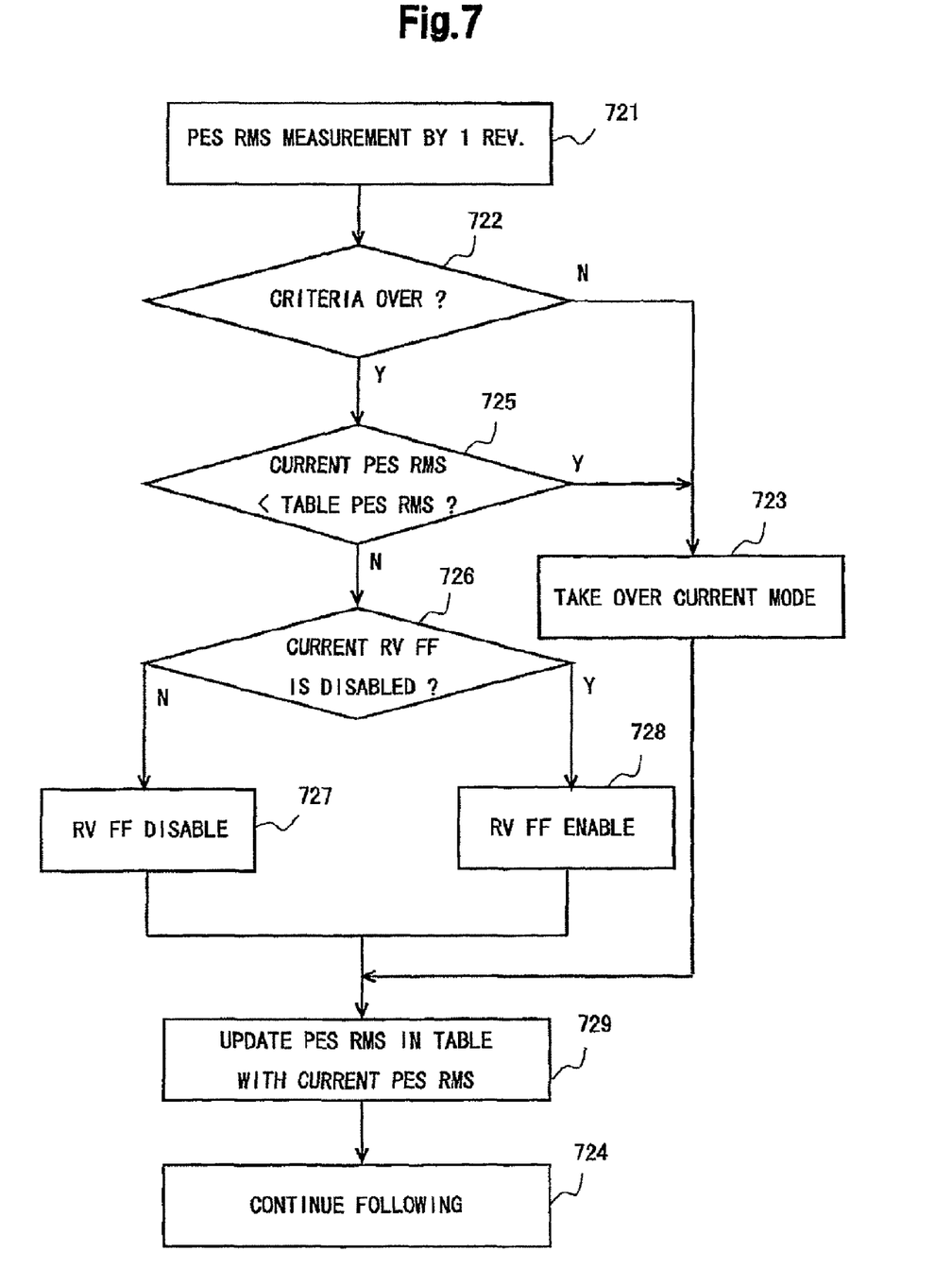
FIG. 7 is a flowchart illustrating a flow of determining a servo mode in a following operation in one embodiment.

Hereinafter, a method for determining the servo mode in a following operation by the HDC/MPU 23 (S172) will be described. The HDC/MPU 23 actually measures the servo positioning accuracy to determine an appropriate servo mode. The HDC/MPU 23 determines the positioning accuracy in the servo mode using the PESs during the following operation to determine the appropriate servo mode.

One of preferred examples for expressing the positioning accuracy is the root mean square (RMS) of the PESs. In the following explanation, the HDC/MPU 23 uses RMS to express the positioning accuracy. The RMS value is a value statistically expressing the intensity of the variable values and it is a preferable value in expressing the positioning accuracy. The HDC/MPU 23 calculates the RMS value in a unit of single rotation of the magnetic disk 11 as shown in FIG. 5(*b*).

Figure 5:
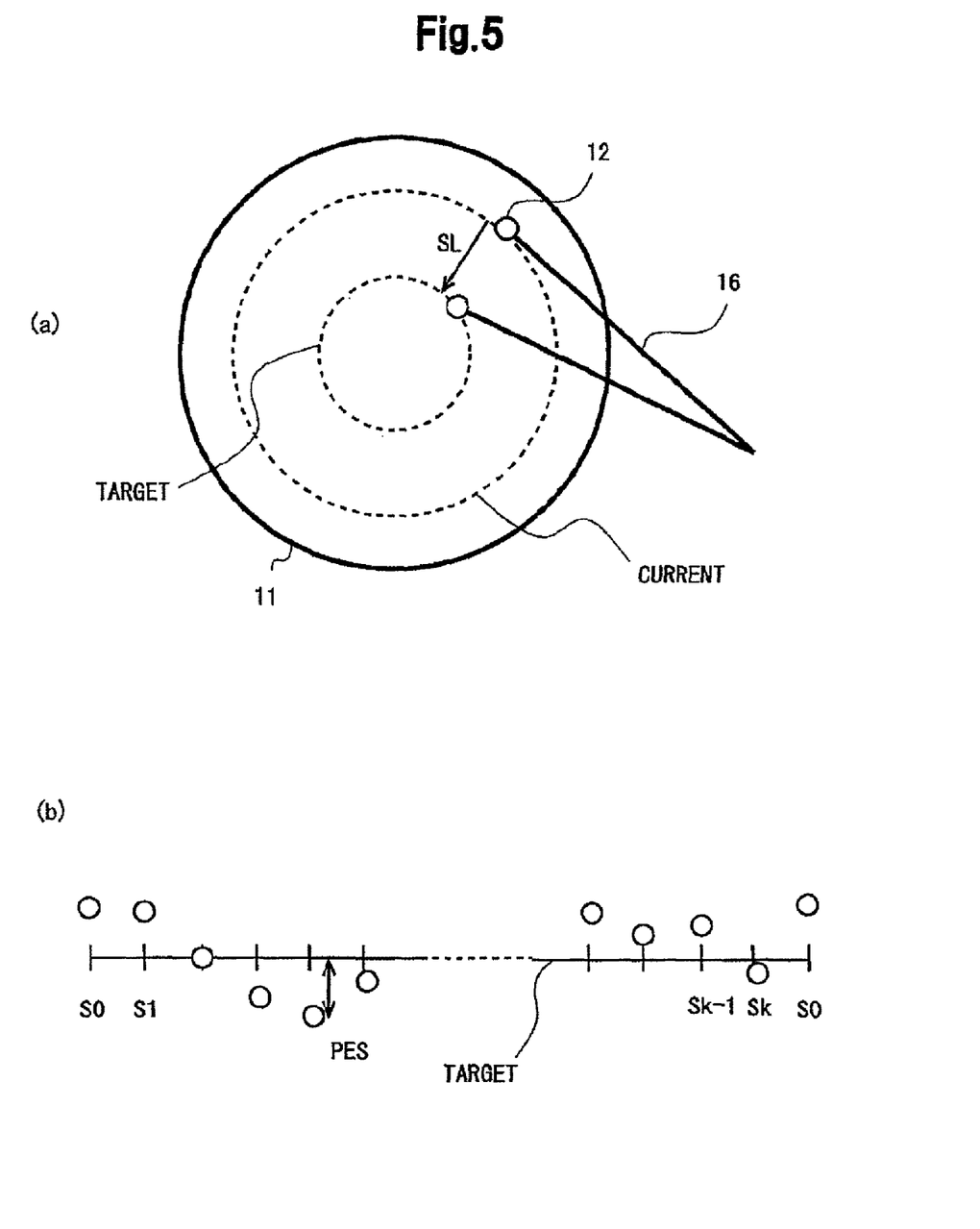
FIGS. 5(a) and 5(b) are drawings for illustrating a method for setting the servo mode in one embodiment.

FIG. 5(*b*) indicates one rotation of target data track (TARGET) and head positions (◯). A PES is a deviation in the radial direction from the target position and its sign differs depending on whether the deviation is toward the inner diameter or toward the outer diameter. In the example of FIG. 5, k+1 frames of servo data (S0 to Sk+1) correspond to one data track. In other words, a head slider 12 retrieves servo data for k+1 times in one rotation of the magnetic disk 11. The RMS value expressing the positioning accuracy is a root mean square of PESs of the k+1 frames of servo data.

When the HDC/MPU 23 starts a following operation, it calculates the RMS value of PESs in one rotation of the magnetic disk 11 (one rotation of the servo track) (S721). The servo mode at this time is the same servo mode as in the last following. If the measured RMS value is within the criteria (Y in S722), the HDC/MPU 23 maintains the current servo mode (S723) and continues the following operation (S724).

Specifically, if the RMS value is not more than the preset reference value, the HDC/MPU 23 maintains the current servo mode. In this way, if the current servo mode satisfies the requisite accuracy, the HDC/MPU 23 continues the following operation in the current servo mode without determining the necessity of switching the servo mode, which omits unnecessary operation for accurate servo positioning to increase operation efficiency.

Figure 8:
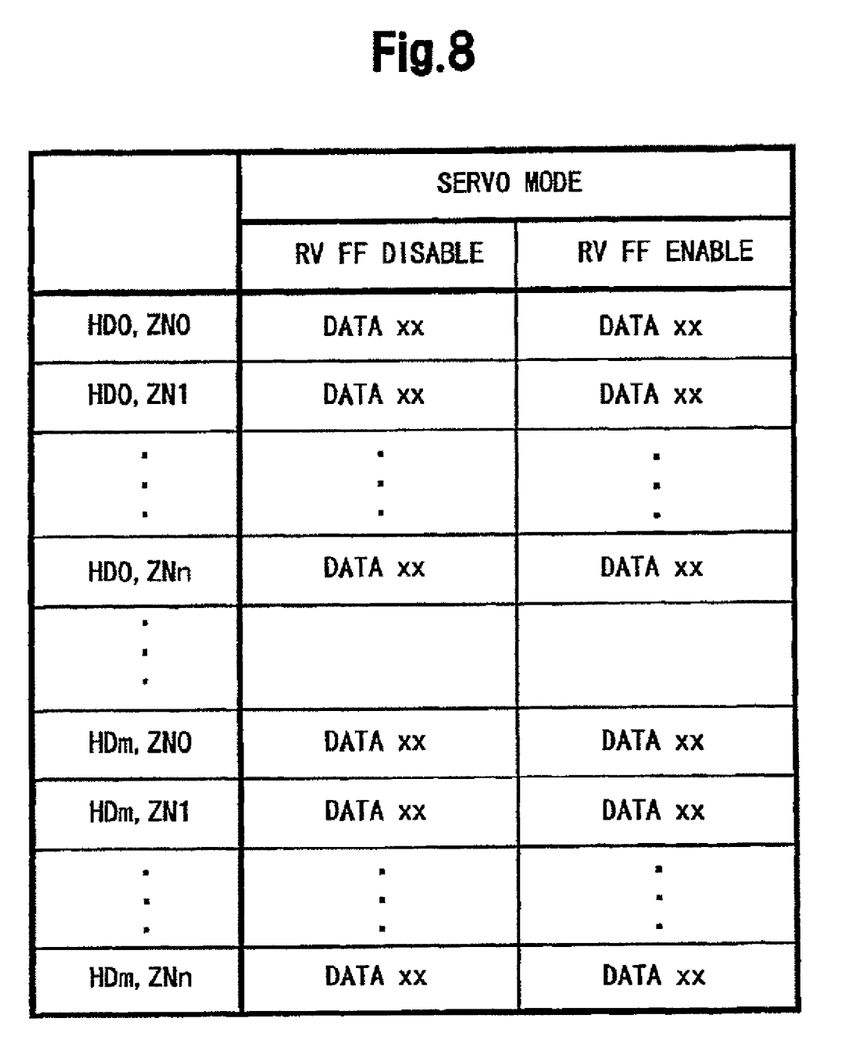
FIG. 8 is a table to store data to be used in determining a servo mode in one embodiment.

If the measured RMS value is over the criteria (N in S722), the HDC/MPU 23 compares the RMS value measured in the current servo mode and the RMS value in the other servo mode registered in a table (S725). FIG. 8 shows an example of this table. DATA xx's denote the RMS values. The table stores RMS values in the vibration correction mode (RV FF ENABLE) and the normal mode (RV FF DISABLE). The table also stores RMS values for every head slider 12 and every zone. The HDC/MPU 23 obtains an RMS value from the table in accordance with the head slider 12 to access the target track and the zone to which the target track belongs.

If the RMS value measured in the current servo mode is smaller than the RMS value in the other servo mode obtained from the table (Y in S725), the HDC/MPU 23 maintains the current servo mode (S723) and continues the following operation (S724). If the RMS value measured in the current servo mode is not smaller than the RMS value in the other servo mode obtained from the table (N in S725), the HDC/MPU 23 switches the servo mode (S726). If the RMS values in the two servo modes are the same, the HDC/MPU 23 may maintain the current servo mode.

That is to say, if the current servo mode is the vibration correction servo mode using the detection value by the vibration sensor 25 (N in S726), the HDC/MPU 23 transfers from the vibration correction servo mode to the normal servo mode without performing vibration correction (S727). If the current servo mode is the normal servo mode (Y in S726), the HDC/MPU 23 transfers from the normal servo mode into the vibration correction servo mode (S728). After the HDC/MPU 23 has switched the servo mode, it continues the following operation in the servo mode (S724).

The HDC/MPU 23 updates the table in accordance with the new measured value of RMS (S729). In FIG. 7, the HDC/MPU 23 updates the table after determining the servo mode (after S723, S727, and S728), but it may update the table at any timing after the measurement of the RMS. Of course, it is necessary to update the table before the next servo mode determination. Updating the table in accordance with the measured value like this achieves more precise determination of the servo mode.

As shown in FIG. 8, the table contains an RMS value for every head slider 12. Since there are manufacturing variations in characteristics of the head sliders 12, measuring an RMS value for every head slider 12 leads to more accurate determination of an appropriate servo mode. It is preferable that the table contain an RMS value for every data track in the point of accuracy in determination. On the other hand, since these data lead to too large contents of the table, it is preferable to divide a recording surface into a plurality of areas and to store their respective RMS values. An example of the divided area is a zone as shown in FIG. 8. Data recording formats are different depending on the zone but it is the same in a zone so that an appropriate servo mode can be determined more precisely.

There are some methods to calculate an RMS value: one of them calculates an RMS value using the PESs of one data track. If the head slider 12 is switched or the head slider 12 is moved from the target track before the calculation ends, the HDC/MPU 23 stops the calculation of the RMS value and restarts the calculation of the RMS value at the moved new target track.

In calculating the RMS value in a unit of data track as described above, the frequency of moving of the head slider 12 before the end of the calculation may increase and the frequency of updating the table may decrease. Then, another method regards all data tracks in a zone as a single data track. The HDC/MPU 23 continues calculation of an RMS value even if the target data track is changed within a zone. If the zone of the target track or the head slider 12 is changed, it restarts the calculation of the RMS (obtaining the PESs therefor) from the beginning.

The table stores RMS values for every zone and every head slider 12 and the RMS value is calculated for the one entry as a unit. The HDC/MPU 23 maintains a PES (or its square value) of each servo data in the RAM 24 and continues measurement of PESs in the same zone regardless of data track switches. When the PES measurement in all the servo data (servo data in one rotation of the magnetic disk) is finished, the HDC/MPU 23 calculates an RMS value from the measurements. Calculating the RMS value in a unit of entry like this allows the frequency of selecting the servo mode and of updating the table shown in FIG. 7 kept within an appropriate range.

Typically, the initial data of the table are all zero. Therefore, the HDC/MPU 23 switches the servo mode in the first determination of the servo mode (S725 in FIG. 7). Typically, in a start-up of the HDD 1, the HDC/MPU 23 clears all the values in the table. Determining an appropriate servo mode to be selected using old data leads to higher possibility for erroneous determination. In one example, the HDC/MPU 23 clears the table when the actuator (a head slider 12) has moved to a retract position. The typical retract position is above the innermost area of the magnetic disk 11 or a ramp. This reduces the possibility of erroneous determination using old data.

As set forth above, the present invention is described by way of particular embodiments but is not limited to the above embodiments and can of course be modified in various ways within the scope of the substance of the present invention. Embodiments of the present invention may be applied to an HDD on which a head slider having only a read element is mounted, or a disk drive device other than an HDD.

The circuit configuration for vibration correction is not particularly limited in application of embodiments of the present invention. An HDD can employ thee or more servo modes and one of them is the vibration correction mode. Values other than the RMS of PESs can be used as values to express the servo positioning accuracy. For example, the RMS can be calculated from the PESs in a half rotation of a magnetic disk.

What is claimed is:

1. A disk drive device comprising:
a disk for storing data;
a head for accessing the disk;
a moving mechanism for supporting and moving the head;
a vibration sensor; and
a controller configured to,
in a correction servo mode, correct servo control of positioning of the head in accordance with detection of the vibration sensor and a normal mode without using the correction,
in a current servo mode, determine accuracy from an error between a servo signal retrieved from the disk with the head and a target track,
select a servo mode with higher accuracy comparing accuracy in the current servo mode with accuracy in a servo mode different from the current mode stored in a table, and
perform positioning of the head using the moving mechanism in the selected servo mode.

2. The disk drive device according to claim 1, wherein the controller updates the table by data indicating accuracy measured in the current servo mode.

3. The disk drive device according to claim 1, wherein the controller performs positioning of the head using the moving mechanism in the current servo mode if accuracy in the current servo mode is within a reference range.

4. The disk drive device according to claim 1, wherein the disk drive device comprises a plurality of heads; and the table contains the accuracy in each of the heads.

5. The disk drive device according to claim 1, wherein the table contains the accuracy in each of areas into which a recording surface corresponding to a head is divided.

6. The disk drive device according to claim 5, wherein
recording formats are the same in each of the divided areas; and
respective recording formats in the divided areas are different from each other.

7. The disk drive device according to claim 5, wherein the controller calculates accuracy corresponding to one area from position error signals of different data tracks in the area.

8. The disk drive device according to claim 1, wherein the controller uses the correction servo mode in moving of the head to the target if the moving length to the target is greater than a reference value.

9. The disk drive device according to claim 1, wherein the controller clears data stored in the table if the controller moves the head to a retract position.

10. The disk drive device according to claim 1, wherein
the disk drive device comprises a plurality of heads; and
the controller maintains the servo mode in switching heads.

11. A method for servo control in a disk drive device having a correction servo mode for correcting servo control for head positioning in accordance with detection of a vibration sensor and a normal servo mode without using the correction, the method comprising:
determining accuracy in a current servo mode from an error between a servo signal retrieved from a disk with a head and a target track;
selecting a servo mode with higher accuracy comparing accuracy in the current servo mode with accuracy in a servo mode different from the current servo mode stored in a table; and performing positioning of the head using a moving mechanism in the selected servo mode.

12. The method according to claim 11, further comprising updating the table by data indicating accuracy measured in the current servo mode.

13. The method according to claim 11, wherein the positioning of the head using the moving mechanism in the current servo mode is performed if accuracy in the current servo mode is within a reference range.

14. The method according to claim 11, wherein the disk drive device comprises a plurality of heads; and the table contains the accuracy in each of the heads.

15. The method according to claim 11, wherein the table contains the accuracy in each of areas into which a recording surface corresponding to a head is divided.

16. The method according to claim 15, wherein
recording formats are the same in each of the divided areas; and
respective recording formats in the divided areas are different from each other.

17. The method according to claim 15, wherein
accuracy corresponding to one area is calculated from position error signals of different data tracks in the area.

18. The method according to claim 11, wherein the correction servo mode is used in moving of the head to the target if the moving length to the target is greater than a reference value.

19. The method according to claim 11, wherein data stored in the table are cleared if the head is moved to a retract position.

20. The method according to claim 11, wherein the servo mode is maintained in switching heads.

* * * * *